United States Patent [19]
Woods et al.

[11] Patent Number: 5,404,489

[45] Date of Patent: Apr. 4, 1995

[54] SYSTEM AND METHOD FOR MINIMIZING CACHE INTERRUPTIONS BY INHIBITING SNOOP CYCLES IF ACCESS IS TO AN EXCLUSIVE PAGE

[75] Inventors: Greg Woods, San Jose; Carol Bassett; Robert Campbell, both of Cupertino, all of Calif.

[73] Assignee: Hewlett-Packard Company, Palo Alto, Calif.

[21] Appl. No.: 236,011

[22] Filed: May 2, 1994

Related U.S. Application Data

[63] Continuation of Ser. No. 654,662, Feb. 13, 1991, abandoned.

[51] Int. Cl.⁶ ............................................. G06F 12/00
[52] U.S. Cl. ................................ 395/425; 364/DIG. 1; 395/400; 395/725
[58] Field of Search ......................... 395/425, 725, 400

[56] References Cited

U.S. PATENT DOCUMENTS

| | | | |
|---|---|---|---|
| 4,622,631 | 11/1986 | Frank et al. | 395/800 |
| 4,959,777 | 9/1990 | Holman, Jr. | 395/325 |
| 4,977,498 | 12/1990 | Rastegar et al. | 395/425 |
| 5,025,365 | 6/1991 | Mathur et al. | 395/600 |
| 5,091,846 | 2/1992 | Sachs et al. | 395/250 |
| 5,119,485 | 6/1992 | Ledbetter, Jr. et al. | 395/425 |
| 5,146,607 | 9/1992 | Sood et al. | 395/800 |

*Primary Examiner*—Glenn Gossage

[57] ABSTRACT

A memory property tagging apparatus is interfaced with one or more caches which are associated with one or more microprocessors of a multiprocessor system having shared memory and a bus network. The apparatus masks off any snoop cycles on the bus network if data corresponding to an address is exclusive to its associated microprocessor(s). The apparatus can specify to its associated one or more caches whether data is cacheable or not. The apparatus can specify to its associated one or more caches whether data is to be treated as write-through or write-back. Finally, the apparatus can translate preselected memory addresses on the bus network into input/output (IO) addresses.

13 Claims, 4 Drawing Sheets

SYSTEM AND METHOD FOR MINIMIZING CACHE INTERRUPTIONS BY INHIBITING SNOOP CYCLES IF ACCESS IS TO AN EXCLUSIVE PAGE

This is a continuation of application Ser. No. 07/654,662, filed on Dec. 31, 1991, now abandoned.

BACKGROUND OF THE INVENTION

I. Field of the Invention

The present invention relates to computer systems, and more particularly, to a computer architecture for providing efficient management of memory shared by processors in a multiprocessor (MP) system.

II. Related Art

In an MP system with processors which share memory space, the MP system must maintain "coherency" among all data in memory. Data could exist in several different locations, including in a main memory and perhaps in other remote memory locations, such as caches.

Coherency refers to the concept in which each central processing unit (CPU) must have access to the latest data corresponding to a particular address in the shared memory. In other words, if a data line at a certain address is simultaneously shared by one or more caches and/or the main memory, then as the data line is updated or changed in one of the memory locations, the latest data line must be identified and available to all of the CPUs. In this document, data line refers to any information stored in memory, including instructions, processed data or unprocessed data. In order to maintain coherency in a conventional MP system, a bus controller/interface monitors a system bus for reads and writes to memory. When the bus controller detects either a memory read or a memory write, the bus controller initiates a snoop cycle which is directed to all of the caches in the MP system.

The protocol implemented for the snoop cycle depends, in large part, on the types of caches used in the MP system. Conventionally, caches have been classified as either "write-back" (WB) or "write-through" (WT). Recently, some caches have been designed so that they can operate as either a WB or a WT cache depending upon the logical state of an input to the cache.

In a WB cache, data lines are written from the WB cache only when the data lines are requested by some other source. Consequently, a local CPU can change data lines in a local WB cache many times without other memory locations in the MP system knowing of the changes.

If during the snoop cycle it is determined that a certain WB cache has modified data, then the certain WB cache provides the modified data to the requesting CPU. If during the snoop cycle a memory write occurs from the WB cache, one conventional protocol for maintaining coherency is to invalidate the data line at all memory locations other than the receiving memory location. A data line is invalidated by changing the state of a local status bit in the directory of the WB cache. The status bit is oftened referred to as a "valid" bit in the industry.

In WT caches, data lines are "written through" to the main memory upon each update or change of the data lines by any processor. Accordingly, the most current data lines are always in the main memory. As a result, a conventional protocol for maintaining coherency among WT caches is to have the bus controller initiate a snoop cycle only on memory writes. No action need be taken on memory reads from the WT cache. Consequently, when an MP system utilizes WT caches, coherency may be maintained with a lessor number of snoop cycles than with WB caches.

However, the foregoing conventional protocols for maintaining coherency in an MP system using WT or WB caches are problematic. Each time that a snoop cycle is initiated, any CPU accessing a cache must temporarily wait while an inquiry is made of a data line in the cache. Consequently, the performance of CPUs is compromised because of the snoop inquiries.

As more processors are added to the MP system, a higher number of snoop cycles must take place and, consequently, more interactions must occur with the caches. Moreover, the buses of the MP system, including the system bus, are characterized by heavy traffic. Accordingly, in a broad sense, the numerous snoop cycles reduce the number of processors that may be operating in the MP system.

SUMMARY OF THE INVENTION

The present invention is directed to a system and method for characterizing different memory space in the shared memory of a multiprocessor (MP) system. The system and method optimize data processing and throughput, while maintaining coherency and minimizing the number of requisite snoop cycles.

The present invention envisions connecting a memory property tagging apparatus to one or more caches associated with one or more microprocessing units (MPU) of the MP system. Optimally, a separate memory property tagging apparatus is allocated to each cache. The memory property tagging apparatus is also in communication with the bus network of the MP system, which could include any number of buses.

The memory property tagging apparatus has a first means for reading addresses from the bus network. It has a second means for specifying whether memory space corresponding to the addressess is either shared or exclusive to the microprocessor(s) which is associated with the cache(s). Finally, it has a third means for preventing any snoop cycle from occurring on the bus network when the memory space is exclusive to the microprocessor(s) associated with the cache(s).

The present invention further envisions including a fourth and fifth means in the memory property tagging apparatus. The fourth means specifies whether the addresses correspond to the shared memory or to an input/output (IO) port. The fifth means translates preselected addresses which correspond to the shared memory into IO addresses. Furthermore, the fourth and fifth means may be incorporated in the apparatus without the inclusion of the second and third means.

The present invention further envisions including a sixth and seventh means in the memory property tagging apparatus. The sixth means specifies whether the addresses correspond to data which is to be treated as write-back type or write-through type. The seventh means directs the cache(s) to either write-back or write-through in response to the sixth means. Moreover, the sixth and seventh means may be incorporated in the apparatus without the inclusion of the second through fifth means.

The present invention also provides for a method in a multiprocessor system having one or more caches, a shared memory, and a bus network. The method includes the following steps. First, a memory access to the shared memory is sensed on the bus network. Second, it is determined whether the memory access is to an exclusive private space in the shared memory. Third, any snoop cycles are masked off from the bus network if the memory access corresponds to an exclusive private space.

The present invention additionally provides for a method in a multiprocessor system having one or more microprocessors, a memory, one or more IO ports, and a bus network connecting the microprocessors. The method comprises the following steps. First, a memory address is retrieved from the bus network. Second, it is determined whether the memory address corresponds to either memory or an IO port. Third, the memory address is translated into an IO address on the bus network if the memory address corresponds to the IO port.

FEATURES AND ADVANTAGES OF THE INVENTION

The present invention overcomes the deficiencies of the related art, as noted above, and further provides for the following additional features and advantages.

The present invention maintains coherency in a multiprocessor system, while minimizing the number of requisite snoop cycles directed to caches. In other words, caches are interrupted less and less traffic exists on the buses of the multiprocessor (MP) system. As a result, data processing and throughput is optimized and more processors may be added to the MP system.

The present invention further optimizes the speed of data processing and throughput by eliminating the need for microprocessors to generate time-consuming input-output (IO) instructions. This feature is especially advantageous for microprocessors, such as the "INTEL" 8086 microprocessor (manufactured by the Intel Corporation, Santa Clara, Calif.), which do not have efficient IO instructions.

Additional features and advantages of the present invention will become apparent to one skilled in the art upon examination of the following drawings and detailed description. It is intended that any additional features and advantages be incorporated herein.

BRIEF DESCRIPTION OF THE DRAWINGS

The present invention as defined in the claims can be better understood with reference to the text and to the following drawings:

DETAILED DESCRIPTION OF THE PREFERRED EMBODIMENT

Figure 1:
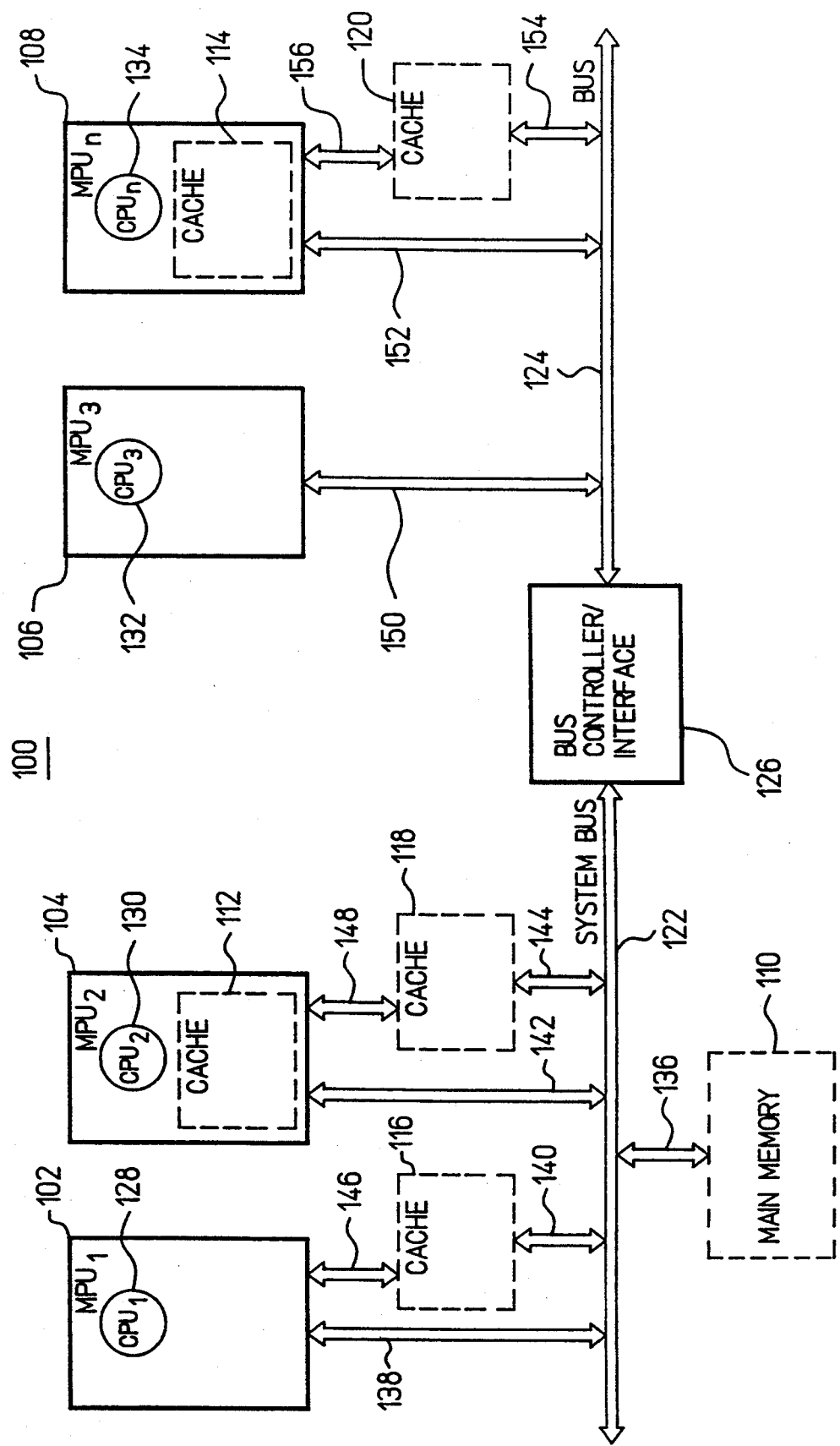
FIG. 1 shows a conventional multiprocessor (MP) system with multiple buses (a bus network) and with various caches, including on-chip caches and/or external caches.

The preferred embodiment can be incorporated into a conventional multiprocessor (MP) system 100 as illustrated in FIG. 1. As shown, the MP system comprises n microprocessing units (MPU) 102-108. With respect to each other, the n MPUs 102-108 may be homogenous or nonhomogeneous.

For example, some of the n MPUs 102-108 may be from the "INTEL" family (manufactured by Intel Corporation, Santa Clara, Calif.) of MPUs while others may be from the "MOTOROLA" family (manufactured by the Motorola, Inc., Fort Worth, Tex.). Furthermore, the present invention may be implemented in MP systems using any type of processor and need not be limited to microprocessors.

As illustrated by phantom lines, FIG. 1 indicates hypothetical memory storage locations in the MP system. The MP system is intended to be a shared memory system, in whole or in part. A main memory 110 serves as the primary memory storage location for the MP system. Some of the n MPUs 102-108 may include on-chip caches 112 and 114. Moreover, some of the n MPUs 102-108 may have external caches 116-120. The external caches could be either private to a particular MPU or shared by one or more other MPUs.

The preferred embodiment further includes a bus network comprising several buses. As shown in FIG. 1, the MP system comprises a fast system bus 122 and a slower bus 124. The buses are interfaced via a bus controller/interface 126, which possesses both control attributes and interface attributes. Worth noting is that the present invention may be implemented in MP systems having any number and variety of architecturally-isolated buses without redefining the protocols and/or the compatibility models of the various buses.

Figure 2:
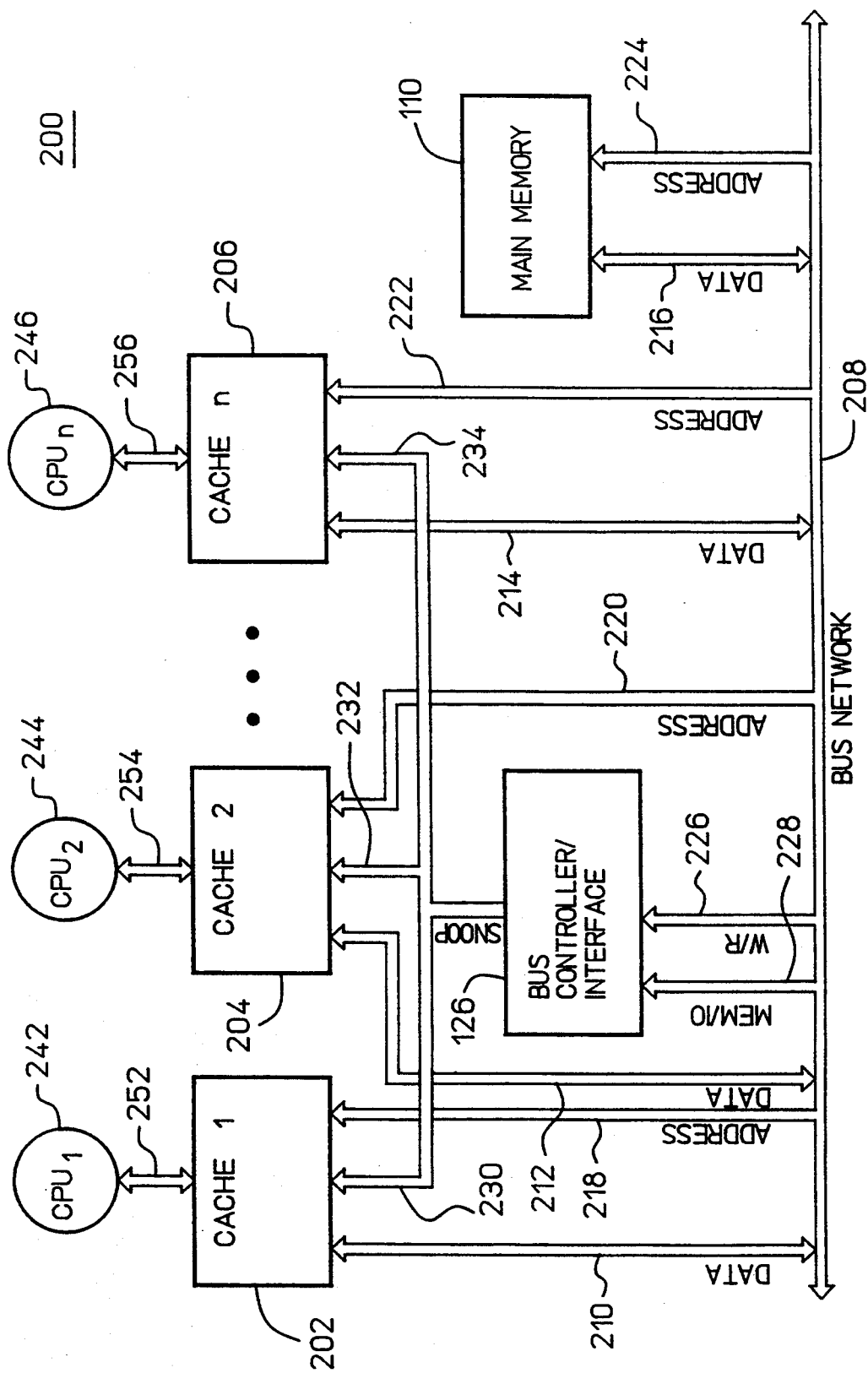
FIG. 2 illustrates the conventional flow of addresses, data, and control signals which occur during a transfer of data in the MP system of FIG. 1 in order to effectuate proper data transfer and to insure data coherency.

FIG. 2 indicates the flow of addresses, data, and control signals which occur during a transfer of data in the MP system of FIG. 1. The flow of addresses, data, and control signals are in accordance with a conventional protocol to effectuate proper data transfer and insure data coherency.

For purposes of discussion, the MP system of FIG. 1 will be assumed to have n caches 202-206, along with the main memory 110. The preceding memory storage locations communicate via the buses 122 and 124 of FIG. 1, which are symbolized in FIG. 2 by a bus network 208.

The interactions of the memory storage locations will first be described where the n caches 202-206 are assumed to be write-back (WB) caches. In this scenario, when a data line is written to a remote memory location by one of the WB caches 202-206, one conventional protocol for maintaining coherency is to invalidate during a snoop cycle the data line at all memory locations other than the receiving memory location.

More specifically, the bus controller/interface 126 monitors the bus network 208 for reads and writes to memory. Memory reads or writes may be initiated by a CPU, bus master, or direct memory access (DMA) device. Reads or writes to memory occur via data buses 210-216, as a result of memory addresses on buses 218-224.

As discussed earlier the protocol implemented in an MP system for maintaining coherency depends, in large part, on the types of caches used in the MP system. In the conventional art, caches can be classified as either "write-back" (WB) or "write-through" (WT).

Again, caches 202-206 are first assumed to be WB caches. When the bus controller/interface 126 detects a bus cycle that is either a memory read or a memory write, the bus controller/interface 126 initiates a snoop cycle. A memory read and a memory write are determined by monitoring a write/read (W/R) control signal line 226 and a memory/input-output (MEM/IO) control signal line 228 on the bus network 208. Moreover, the snoop strobe from the bus controller/interface 126 is generically transmitted to all of the n caches 202–206 in the MP system, as shown by arrows 230–234.

Upon receipt of the snoop strobe, each of the n caches 202–206 checks for the data line in its memory storage space. If the data line is present in a WB cache and there is a memory write to the WB cache, then the data line is invalidated by changing the state of a local status bit known as a "valid" bit, corresponding to the data line. However, if the data line is present and there is a memory read from the WB cache, then the data line is transferred from the WB cache. In conclusion, when WB caches are used in the MP system, a snoop cycle is conventionally initiated by the bus controller/interface 126 upon each memory read and write.

When the n caches 202–206 are of the write-through (WT) type, a different protocol is conventionally used to maintain coherency. Coherency may be maintained with a lessor number of snoop cycles initiated by the bus controller/interface 126 in comparison with the implementation utilizing WB caches.

As in the conventional systems discussed earlier, the WT caches of the present invention "write through" to the main memory 110 upon each update or change of a data line in memory storage. Accordingly, the most current data lines are always in the main memory 110. As a result, a conventional protocol for maintaining coherency is to have the bus controller/interface 126 initiate a snoop cycle only on memory writes to a WT cache. No action need be taken on memory reads from a WT cache.

However, both of the foregoing conventional protocols for maintaining coherency in the MP system using either WT or WB caches present problems in regard to performance. Each time that a snoop cycle occurs, any central processing unit (CPU) accessing a cache must temporarily wait while an inquiry is made for the data line in the cache. The performance of the CPUs are effectively compromised as a result of the line inquiries in caches.

As more processors are added to the MP system, a higher number of snoop cycles results and, consequently, more interactions must occur with the n caches 202–206. Accordingly, the bus network 208 of the MP system is characterized by heavy traffic. Moreover, in a broad sense, the excessive number of snoop cycles limits the number of processors that may be operating in the MP system.

Figure 3:
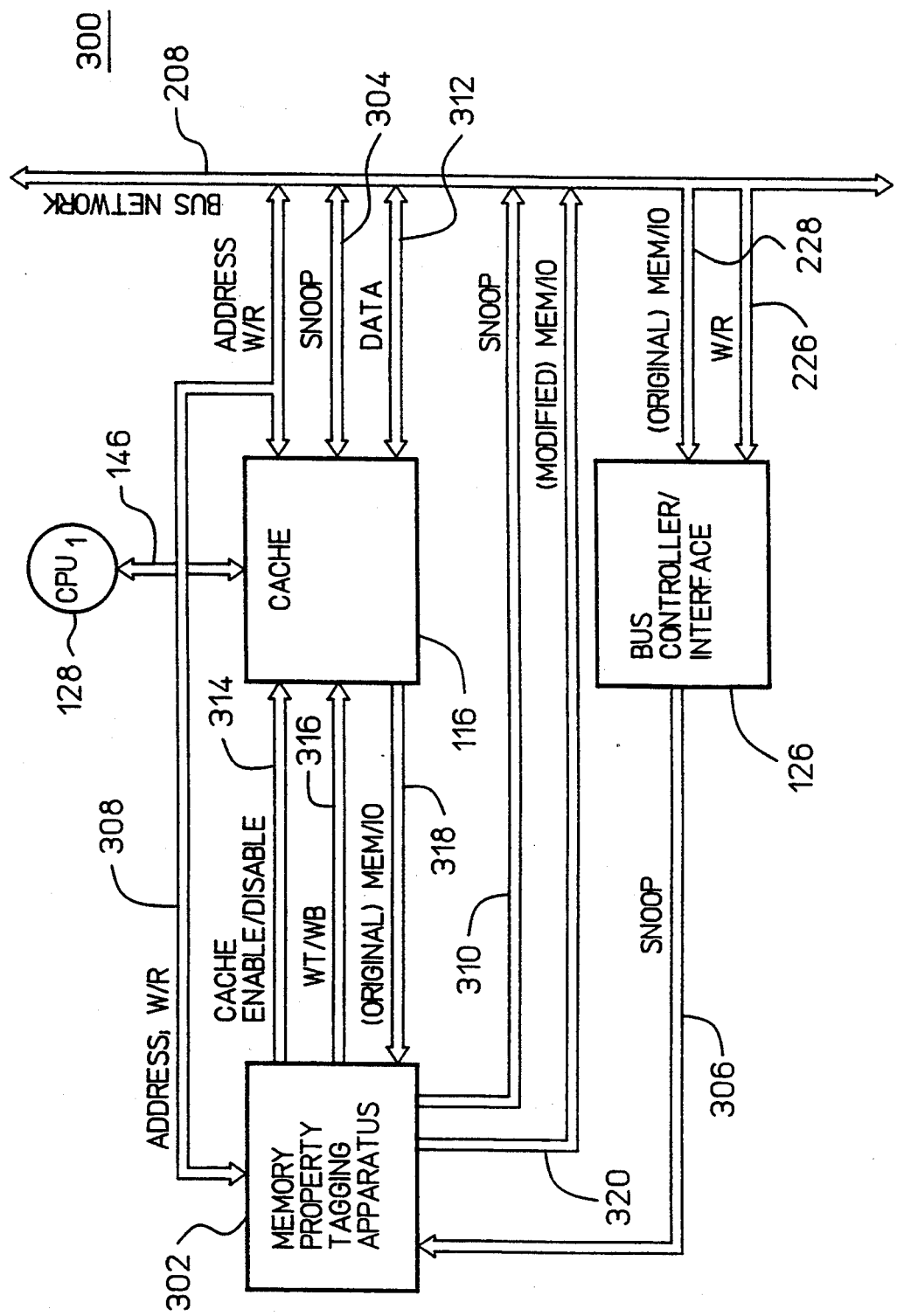
FIG. 3 illustrates the preferred embodiment of the present invention which involves interfacing a memory property tagging apparatus to caches of the MP system.
Figure 4:
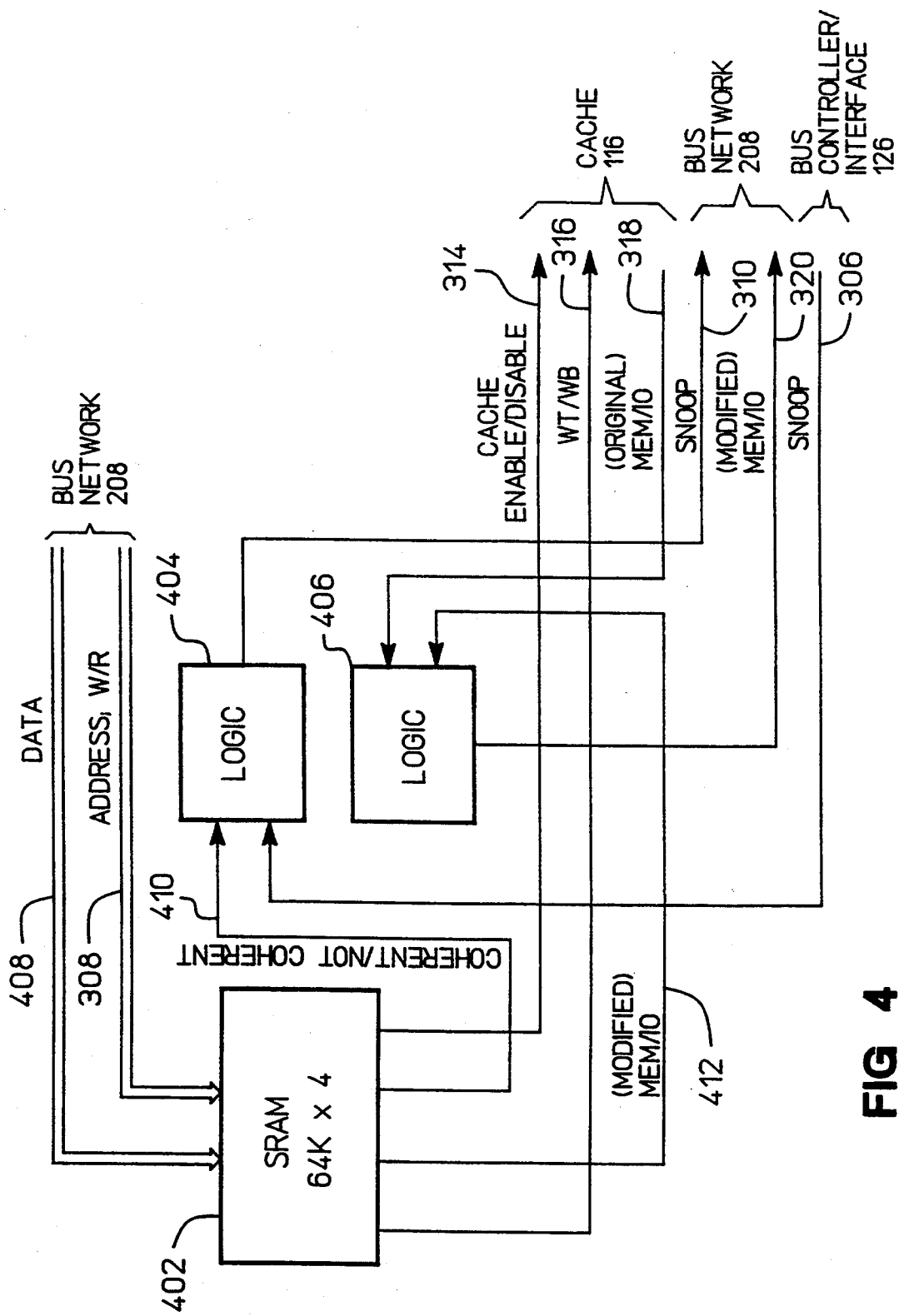
FIG. 4 shows a low level block diagram of the memory property tagging apparatus of the preferred embodiment, as shown in FIG. 3.

FIG. 3 illustrates the preferred embodiment of the present invention. FIG. 4 is a low level block diagram of the memory property tagging apparatus 302 of the present invention. The preferred embodiment involves interfacing a memory property tagging apparatus 302 preferrably to each of the caches 112–120 of the MP system of FIG. 1. As an example, the memory property tagging apparatus 302 is shown interfaced to the cache 116 of FIG. 1. The memory property tagging apparatus 302 could have been shown interfaced to any of the n caches of FIG. 1.

Essentially, the memory property tagging apparatus 302 assigns properties to pages of data in the shared memory. In the preferred embodiment, each page is identified as having 4 properties as follows: (1) either coherent or not coherent, (2) either cacheable or not cacheable, (3) either write-through (WT) or write-back (WB), and (4) either memory (MEM) or input-output (IO).

When any of the MPUs 102–108 of FIG. 1 is attempting to read or write data lines, control signals indicating that a memory access is to occur, as discussed previously, will be outputted by a CPU, bus master, or DMA device onto a bus of the MP system's bus network 208. The controller/interface 126 detects the control signals, including specifically the W/R control signal line 226 and the MEM/IO control signal line 228.

In turn, the bus controller/interface 126 initiates or provokes a snoop cycle. However, in the preferred embodiment, snoop strobes are channelled exclusively to the memory tagging apparatus 302, as shown by a snoop control signal line 306. Consequently, the memory property tagging apparatus 302 is informed that a memory access is about to take place.

Accordingly, the memory property tagging apparatus 302 reads the address of the memory access from the bus network 208, as shown by a bus 308. The memory property tagging apparatus 302 next determines the memory page comprising the data corresponding to the address and retrieves the four properties that have been assigned to the particular memory page which are stored in a lookup table (discussed below). The properties describing the memory page can then be used to optimize performance as will be discussed in detail below.

The properties can be stored in and retrieved from any conventional lookup table situated in the memory property tagging apparatus 302. The properties can be set during the power-on or initialization of the MP system by programming the memory property tagging apparatus 302.

One of the properties assigned to the memory page that is retrieved is whether the memory page is either coherent or not coherent. The immediate discussion that follows will focus on the foregoing concept.

In the conventional MP system of FIG. 1, each of the MPUs 102–108 has a corresponding exclusive memory space in the main memory 110. In other words, each of the MPUs 102–108 has a memory space which is not used by any other MPU, bus master, DMA device, or memory user.

The exclusive memory spaces usually result from software default, due to the nature of UNIX operating systems. Moreover, the capacity of these exclusive spaces depends upon the implementation of the UNIX operating system.

Information stored in these exclusive memory spaces could include, for example, the state of a coprocessor. Specifically, if any of CPUs 128–134 has a coprocessor and the CPU receives an interrupt, the CPU must save the state of the coprocessor in order to resume proper functioning upon return from the interrupt.

When any of the MPUs 102–108 accesses its private space, a snoop cycle is performed. The other MPUs are temporarily disturbed. They are forced to allow a snoop cycle to occur, instead of proceeding with the execution of their own instruction set. Worth noting is that the other MPUs lose time even if their associated cache(s) (on-chip, private, or shared) do not have the pertinent data line.

In the present invention, the memory property tagging apparatus 302 specifies, among other things, whether the data corresponding to the address on the bus 308 is either coherent or not coherent. In other words, the memory property tagging apparatus 302 indicates whether the data is either exclusive to its associated cache(s), or alternatively, shared by other MPUs.

If the access is to an exclusive memory space of the cache's associated CPU(s), then the memory property tagging apparatus 302 will mask off the snoop cycle so that none of the other non-associated MPUs receive snoop strobes. However, if the memory access is not to the exclusive memory space of the cache's associated CPU(s), then a snoop cycle is initiated on the bus network 208 as indicated in FIG. 3 by a snoop control signal line 310. Thus, performance is increased because CPUs are not disturbed by an unnecessary snoop cycle.

Another property assigned to pages of memory in the preferred embodiment is whether each memory page is either cacheable.or not cacheable. By having this information locally-available with respect to the cache 116, the number of snoop cycles on the bus network 208 is minimized. The memory property tagging apparatus 302 retrieves this information upon detecting a memory read and relays it to its corresponding cache 116 via the cache enable/disable (also known as "KEN") control signal line 314. The immediate discussion that follows will focus on the foregoing cacheability concept.

The n MPUs 102–108 of FIG. 1 typically read data lines of 8, 16, or 32 data bits. However, the caches 112–120 commonly have data lines which are larger, perhaps two, three, or four times as large. The cache enable/disable control signal line 314 is a way of indicating to the cache 116 (on-chip or external) whether it is worthwhile with regard to performance to load in a new data line into the cache 116.

The determination of whether a data line is either cacheable or not cacheable is highly dependent upon the design of the MP system. For example, in many MP systems if a CPU is reading from the main memory, then the data line should probably be cached. However, in many MP systems if a data buffer or remote cache is being read from, then the data line should probably not be cached, because the data might be continuously changing and will therefore require a number of snoop cycles.

As mentioned above, the properties, including data cacheability, can be set during the power-on of the MP system by programming the memory property tagging apparatus 302. It is known what addressing regions in memory are subject to continued change and which are not. The addressing regions of memory which are not subject to frequent changes are earmarked as cacheable, whereas those regions which are frequently changed are not.

Another property assigned to the memory in the preferred embodiment is whether a memory page is to be treated as either write-through (WT) or write-back (WB). By having this information locally-available with respect to the cache 116, the number of interactions as well as snoop cycles on the bus network 208 are minimized. The memory property tagging apparatus 302 retrieves this information upon detecting any memory access via the MEM/IO control signal line 318 and relays it to its corresponding cache 116 via the WT/WB control signal line 316. The immediate discussion that follows will focus on the foregoing concept.

Most conventional caches that are of the writeback (WB) type, including cache 116, have an input known as the write-back/write-through (WB/WT) input. The input allows the cache 116 to be used in a WT manner. By considering the timing charts of most caches, it is apparent that the WB/WT input is considered by the cache 116 when the cache 116 is enabled.

In the preferred embodiment, the WB/WT input is not used in a global sense to convert the cache 116 from a WB type to a WT type. The WB/WT input is used to inform the cache 116 whether to tag a data line as either of the write-back type or of the write-through type. Consequently, the cache 116 in the preferred embodiment can treat some data lines in a write-back fashion and others in a write-through fashion, depending on the signal from the memory property tagging apparatus 302.

Numerous advantages are envisioned as a result of the WT/WB property in the preferred embodiment. Referring to FIG. 3, if a data line is shared by one or more caches, then the data line can be tagged as a write-through line to maintain coherency. However, in contrast, when a data line is exclusively owned (exclusive space) by, for example, the cache 116, then the preferred embodiment envisions tagging the data line as a write-back type by the memory property tagging apparatus 302. This action minimizes the number of interactions as well as snoop cycles on the bus network 208.

Furthermore, in the conventional art, some memory addresses correspond to memory locations on industry standard buses which have no support for cache coherency, such as control lines for snoop cycles. One such bus is the extended industry standard architecture (EISA) bus. For example, video memory on the EISA bus is located at a particular address and comprises video memory. In order to keep the memory on an IO card on such a bus coherent with the memory of the other caches, the preferred embodiment envisions tagging a data line as a write-through line when the data line is read from such a bus having no support for cache coherency.

Still another property assigned to the memory by the memory property tagging apparatus 302 in the preferred embodiment is whether a memory page of data corresponds to either an IO apparatus or memory. The immediate discussion that follows will focus on the foregoing concept.

It should be noted that this property can be used to describe a page of memory not only in an MP system, but also in a single processor (SP) system in order to increase performance. Essentially, the assignment of this property by the memory property tagging apparatus 302 reduces the software overhead in the n MPUs 102–108, thereby increasing the speed of the n MPUs 102–108.

In order to understand this concept, it is important to understand that many different instruction types may be executed by the n MPUs 102–108. In particular, if any of the n MPUs 102–108 are from the "INTEL" family, then they can execute numerous different types of memory instructions for flexibility and versatility.

However, with respect to IO instructions, MPUs are generally limited. For example, only few kinds of IO instructions exist in the "INTEL" MPUs. Moreover, these IO instructions are very limited in regard to function scope and performance.

Specifically, internal registers within the MPUs must first be manipulated in order to perform IO instructions, which leads to very slow execution of the instructions. One reason is that many IO cards require 16 bits, for example, for each access due to the 16 bit registers on the IO cards. Accordingly, in the "INTEL" family of MPUs, each MPU is required to first save two 8-bit registers of data. Next, the MPU must combine these two registers. Finally, the MPU must then execute the IO instruction which consumes relatively more time than other instructions. Thus, much software overhead exists, resulting in a degradation of performance.

Furthermore, many commercially available subsystems and IO cards, including, for example, hard disk drive controllers, have their memory registers mapped only into IO addressing space. These subsystems and IO cards can only be accessed by performing slow IO instructions thereby making the IO instructions a must in most MP systems.

The preferred embodiment envisions implementing IO accesses without having any of the n MPUs 102-108 perform IO instructions. Addresses from the n MPUs 102-108 are input to the memory property tagging apparatus 302 and are converted to either memory addresses or IO addresses.

On the "INTEL" 80386 and 80486 MPUs, for example, there exists a control definition output (MEM/IO) which indicates whether an address is either to memory or to an IO port.

In the preferred embodiment as illustrated in FIG. 3, addresses are input to the memory property tagging apparatus 302 via the bus 308. Further, the cache 116 indicates to the memory property tagging apparatus 302 whether the address is earmarked as a memory address or an IO address, as shown by a MEM/IO (original) control signal line 318. Worth noting is that the cache 116 may be either an on-chip cache, such as caches 112 and 114 of FIG. 1, or an external cache, such as 116, 118, or 120 of FIG. 1.

In turn, the memory property tagging apparatus 302 will make the final determination as to whether the address should stay as a memory address or be converted to an IO address. Via MEM/IO (modified) control signal line 320, the memory property tagging apparatus 302 instructs the bus network 208 to treat the address as either a memory address or an IO address.

FIG. 4 shows a low level block diagram of the memory property tagging apparatus 302 of the preferred embodiment. The memory property tagging apparatus 302 comprises a static random access memory (SRAM; 64 Kb×4), logic 404, and logic 406. The logic circuits 404 and 406 could be implemented via conventional programmable array logic (PAL) or the like.

In the preferred embodiment, the shared memory is broken down into pages having a memory storage capacity of 64 Kilobytes (Kb). However, studies indicate that the optimal page size for implementing the present invention is 4 Kb for several reasons. First, the natural page size of the "INTEL" family of microprocessors is 4 Kb. Second, the base source page size of American Telephone and Telegraph (AT&T)/386 UNIX is 4 Kb. In other words, when UNIX operating systems spawn a new process, memory is allocated in increments of 4 Kb.

However, in the preferred embodiment of the present invention, the memory property tagging apparatus 302 characterizes every 64 Kb of memory because currently available SRAM technology dictates this size. When SRAM technology catches up with high performance system requirements, the page size of the memory property tagging apparatus 302 should be adjusted down to 4 Kb.

There are three major impacts of dividing memory into 64 Kb increments. First, additional complexity must exist in the memory property tagging apparatus 302. Second, additional overhead must exist in the memory property tagging apparatus 302. Third, performance is slightly compromised. For instance, the least efficient performance option with respect to the properties must be chosen for some 4 Kb pages because they are associated with one or more additional 4 Kb pages within a 64 Kb page. For example, the performance option may be either write through or write back.

In FIG. 4, the properties of each 64 Kb page are identified by only 4 data bits in the preferred embodiment. The 4 data bits are as follows: (1) a coherency (coherent/not coherent) bit, (2) a cacheability (cache enable/disable) bit, (3) a write-through/write-back (WT/WB) bit, and (4) a memory/input-output (MEM/IO) bit.

As shown, these 4 data bits are programmed into the SRAM 402 from the main memory 110 via a data bus 408 and the address bus 308 during power-on or initialization of the MP system. The SRAM 402 is 64 Kb by 4 bits.

In operation, the 4 data bits are outputted in response to an address on address bus 308 from the bus network 208. The 4 data bits are outputted from the SRAM 402 respectively onto a coherency control signal line 410, a cacheability control signal line 314, the WT/WB control signal line 316, and a MEM/IO control signal line 310.

Any snoop strobe on snoop control signal line 306 from the bus controller/interface 126 is combined with the coherency bit on coherency control signal line 410 at the logic 404. The coherency bit serves to mask off snoop cycles from the bus controller/interface 126 when a data page is in the local processor's private storage area, as discussed in detail previously.

Moreover, the logic 406 combines the MEM/IO definition control signal (original) on MEM/IO control signal line 318 with the modified MEM/IO bit on MEM/IO control signal line 412. The modified MEM/IO bit serves to selectively convert a memory access to an IO access. Consequently, when a conversion is performed, the perception to the remainder of the MP system is that an IO instruction has been executed by the MPU, rather than the actual, faster memory instruction.

Although the preferred embodiment calls for one memory property tagging apparatus 302 per each cache 116, the present invention may be implemented with less than a one-to-one correspondence. In other words, the present invention could be practiced with one memory property tagging apparatus 302 servicing one or more caches, if the caches are coupled to the same bus. Also worth noting is that a cache may be accessible to more than one MPU.

However, the preceding derivative embodiments of the preferred embodiment have drawbacks. The derivative embodiments would lead to more snoop cycles than if a memory property tagging apparatus existed for each cache. One primary reason is that the memory map of the memory property tagging apparatus 302 would need to be more expansive and less precise. In other words, it would need to combine and commonly map the characteristics of more than one cache and perhaps more than one processor. A main thrust of the present invention is to individualize information and make it locally-available to caches and MPUs.

It should be understood that the present invention is not limited to its preferred embodiment, and that the examples presented above are merely for the purposes of illustration. The scope of the present invention should therefore be interpreted by the following claims as defined by the foregoing figures and text.

We claim the following:

1. A system for minimizing cache interruptions in a multiprocessor system having a shared memory, a processor, and a cache coupled to the processor, the cache having a shared memory space for storing data which is also stored in the shared memory and an exclusive memory space for storing data which is only stored in the cache, the system comprising:

first means, coupled to the cache, for reading a data address from a bus network corresponding to data stored in a designated memory space of said cache;

second means, coupled to said first means, for specifying a coherency property of said designated memory space, said coherency property indicating whether said designated memory space is included in the shared memory space or in the exclusive memory space of the cache, said second means generating a coherency signal representing said coherency property; and third means, coupled to said second means, for provoking a snoop strobe received from said bus network when said coherency property indicates said designated memory space is included in the shared memory space and for inhibiting said snoop strobe when said coherency property indicates said designated memory space is included in the exclusive memory space.

2. The system of claim 1, wherein said first means and said second means comprise a (SRAM) coupled to said bus network, said SRAM configured to receive said data address and to output said coherency signal.

3. The system of claim 2, wherein said SRAM comprises memory pages each with a 4 Kilobyte capacity.

4. The system of claim 2, wherein said SRAM comprises memory pages each with a 64 Kilobyte capacity.

5. The system of claim 2, wherein said third means comprises a discrete logic unit coupled to said SRAM and to said bus network, said discrete logic unit configured to receive said coherency signal from said SRAM and said snoop strobe from said bus network and to output a provoked snoop strobe.

6. The system of claim 1, further comprising:

fourth means, coupled to said first means, for specifying a memory/input-output property of said designated memory space, said memory/input-output property indicating whether said designated memory space is allocated to the shared memory or to an input/output port, said fourth memory generating a memory/input-output signal representing said memory/input-output property; and fifth means, coupled to said fourth means, for translating said data address into an input-output address when said memory/input-output property indicates said designated memory space is allocated to said input-output port.

7. The system of claim 6, further comprising:

sixth means, coupled to said first means, for specifying a write-through/write-back property indicating whether said designated memory space containing said data corresponding to said data address is to be configured as a write-back type cache or a write-through type cache, said sixth means configured to generate a WT/WB signal representing said write-through/write-back property; and seventh means, coupled to said sixth means and to the cache, for transferring said WT/WB signal to the cache.

8. The system of claim 7, further comprising:

eighth means, coupled to said first means, for specifying a cacheability property indicating whether said designated memory space containing said data corresponding to said data address is a cacheable memory space or a non-cacheable memory space, and for generating a cacheability signal representing said cacheability property; and ninth means, coupled to said eighth means and to the cache, for enabling the cache when said cacheability signal indicates said designated memory space is cacheable memory space, and for disabling the cache when said cacheability signal indicates said designated memory space is non-cacheable memory space.

9. The system of claim 6, wherein said first means, said second means, and said fourth means comprise a static random access memory (SRAM) coupled to said bus network, said SRAM configured to receive said data address and to output said coherency signal and said memory/input-output signal.

10. The system of claim 9, wherein said third means comprises a discrete logic unit coupled to said SRAM and to said bus network, said discrete logic unit configured to receive said coherency property signal from said SRAM and said snoop strobe from said bus network and to output a provoked snoop strobe to said bus network.

11. The system of claim 10, wherein said fifth means comprises a second discrete logic unit coupled to said SRAM, said second discrete logic unit configured to receive said memory/input-output signal from said SRAM.

12. A method for minimizing cache interruptions in a computer system having one or more caches, a plurality of processors, a shared memory, and a bus network coupling the one or more caches with the shared memory, each of the one or more caches comprising memory pages, the method comprising the steps of:

(1) specifying each memory page of each of the one or more caches as either an exclusive memory page or as a shared memory page, said shared memory page configured to store data which is shared with respect to the plurality of processors;

(2) sensing on the bus network that an access to said shared memory has been initiated;

(3) specifying whether said access is to said exclusive memory page in said shared memory based on an address associated with said access to said shared memory; and (4) generating a signal indicating that a snoop cycle on the bus network can be ignored if said access is to said exclusive memory page.

13. The method of claim 12, wherein the computer system further comprises one or more input/output ports, the method further comprising the steps of:

(5) retrieving a shared memory address from the bus network;

(6) determining whether said shared memory address corresponds to a memory space identifying the shared memory or the one or more input/output ports; and (7) translating said shared memory address into an input/output address on the bus network if said shared memory address corresponds to the one or more input/output ports.

* * * * *